(12) United States Patent
Horn et al.

(10) Patent No.: US 7,240,725 B2
(45) Date of Patent: Jul. 10, 2007

(54) DEVICE FOR CLIMATE CONTROL OF A DRIVER'S BED

(75) Inventors: Oliver Horn, Munich (DE); Noureddine Khelifa, Munich (DE); Wolfgang Kraemer, Munich (DE)

(73) Assignee: Webasto Thermosysteme GmbH, Neubrandenburg (DE)

( * ) Notice: Subject to any disclaimer, the term of this patent is extended or adjusted under 35 U.S.C. 154(b) by 0 days.

(21) Appl. No.: 10/658,746

(22) Filed: Sep. 10, 2003

(65) Prior Publication Data
US 2004/0123976 A1    Jul. 1, 2004

(30) Foreign Application Priority Data
Sep. 11, 2002    (DE) ............................. 102 42 464

(51) Int. Cl.
*B60H 1/00* (2006.01)
*B60H 3/00* (2006.01)
*F25B 29/00* (2006.01)

(52) U.S. Cl. .................. 165/202; 165/10; 165/41; 165/42; 165/43; 165/48.1; 165/236; 62/244; 62/406; 62/430; 62/393; 62/434; 62/435; 237/12.3 A; 237/12.3 B

(58) Field of Classification Search ............ 165/202, 165/10, 48.1, 236, 41, 42, 43; 62/406, 430, 62/393, 434, 435, 244; 237/12.3 A, 12.3 B
See application file for complete search history.

(56) References Cited

U.S. PATENT DOCUMENTS

| | | | | |
|---|---|---|---|---|
| 4,300,720 A | * | 11/1981 | Baier et al. | 237/12.3 B |
| 5,265,437 A | * | 11/1993 | Saperstein et al. | 62/435 |
| 5,322,217 A | * | 6/1994 | Brocx et al. | 237/12.3 B |
| 5,871,041 A | * | 2/1999 | Rafalovich et al. | 165/10 |
| 6,059,016 A | * | 5/2000 | Rafalovich et al. | 165/202 |
| 2002/0100290 A1 | | 8/2002 | Herta et al. | |

FOREIGN PATENT DOCUMENTS

| | | |
|---|---|---|
| DE | 196 45 544 A1 | 5/1998 |
| DE | 199 12 139 C1 | 5/2000 |
| DE | 199 00 947 A1 | 8/2000 |
| DE | 100 65 279 C1 | 7/2002 |

* cited by examiner

*Primary Examiner*—John K. Ford
(74) *Attorney, Agent, or Firm*—David S. Safran

(57) ABSTRACT

A device for climate control of a vehicle is provided which includes a coolant circuit in which coolant flows through a compressor, a condenser, and an evaporator; a heat transfer medium circuit in which heat transfer medium flows through a heat source and a heat exchanger; and a heat/cold reservoir in which the evaporator and the heat exchanger are located. The device of the present invention provides an improved and comparatively economical approach to climate control in the area of a driver's bed in a motor vehicle interior by, at least in part, using a heating/cooling surface for a driver's bed and/or vehicle interior wall, which is integrated into the heat transfer medium circuit such that the heat transfer medium can flow selectively through the heating/cooling surface, or the heat transfer medium which is conveyed by the heat source can flow through the heating/cooling surface.

3 Claims, 5 Drawing Sheets

DEVICE FOR CLIMATE CONTROL OF A DRIVER'S BED

BACKGROUND OF THE INVENTION

1. Field of the Invention

The present invention relates to a device for climate control of a vehicle interior with a coolant circuit, in which coolant flows through a compressor, a condenser, and an evaporator, with a heat transfer medium circuit in which heat transfer medium flows through a heat source and a heat exchanger, and a heat/cold reservoir in which the evaporator and the heat exchanger are located.

2. Description of Related Art

A device of this type is known from German patent 100 65 279 C1 and corresponding U.S. Patent Application Publication 2002/0100290. In this climate control means, a coolant circuit and a heat transfer medium circuit are coupled in terms of themral engineering using a reservoir which is used to store both heat and cold. In particular, the device has a comparatively simple structure and furthermore has an especially fast response behavior.

German patent application 196 45 544 A1 discloses a climate controlled driver's seat which has at least one combined heating/cooling element which for climate control of the vehicle seat can be connected to the secondary circuit of a heat exchanger which is supplied on the primary side by at least one on-board heat generator, or to the secondary circuit of a heat exchanger which is supplied on the primary side by at least one onboard cold generator. It is furthermore proposed that alternative heating/cooling of the driver's seat is possible by it being selectively connectable via the heat exchanger to the vehicle heating system or the auxiliary heating system or to the vehicle air conditioning system or auxiliary air conditioning system.

SUMMARY OF THE INVENTION

One object of the present invention is to make available a device for climate control of the vehicle interior, with which especially an improved, and moreover comparatively economical, approach to climate control in the area of a driver's bed in the vehicle interior or a vehicle interior wall is possible.

This object, and other objects, are achieved by providing a device for climate control of the vehicle interior, in which there is a heating/cooling surface for a driver's bed and/or vehicle interior wall, i.e., a surface heating system integrated into the heat transfer medium circuit such that the heat transfer medium which is transported by the heat exchanger can flow selectively through it, or the heat transfer medium which is conveyed by the heat source can flow through it.

The climate control of a driver's bed in the vehicle interior or a vehicle interior wall or cab wall has a major effect on the well-being of the driver with respect to his resting during rest breaks. It has therefore long been desired that the vehicle interior or the sleeping berth of motor vehicles be comprehensively temperature-controlled.

In the climate control of driver's bed or the rear wall of the cab, in the past, air was used as the heat transfer medium resulting in the driver's bed or the rear wall of the cab having to be made technically complex. Temperature control of the driver's bed or the rear wall of the cab via so-called surface heaters with a manageable technology is more advantageous.

Compared to these prior climate control systems, the device of the present invention offers the advantage that a cooling/heating surface through which especially a liquid heat transfer medium flows is used. With a liquid heat transfer medium, large amounts of energy can be transported and therefore it is possible for the driver's bed to be rapidly heated and cooled to the required amount. The cooling/heating surface of the present invention is moreover integrated into the device such that the cooling/heating surface can transport the same heat transfer medium, one time cooling being possible and then another time, heating. Thus the driver's bed of the present invention or the interior wall of the vehicle can be cooled as well as heated in an especially simple manner. Therefore, the present invention permits abandonment of a complex technology for switching and rerouting of coolant or heat transfer medium.

With the present invention, the same heat transfer medium is transported on the one hand by the heat source in order to directly heat the driver's bed or the interior wall of the vehicle, and on the other, the same heat transfer medium can be transported by the heat exchanger in the reservoir, in order especially to cool. In addition, the device of the present invention has the advantage that the driver's bed and/or the vehicle interior wall can also be heated out of the reservoir, specifically in the case in which the reservoir has to be charged beforehand with the thermal energy of the heat source by the heat exchanger. In this way, the driver's bed of the present invention, or the vehicle interior wall, can be brought to the desired temperature quickly.

In one advantageous embodiment of the invention, the heating/cooling surface for the driver's bed and/or the vehicle interior wall is arranged in a parallel connection to the heat exchanger in the heat transfer medium circuit. The parallel connection enables three basic flow paths which can be cleared individually, or also in combination, in an especially simple manner for flowing heat transfer medium. A first flow path leads from the engine cooling circuit as a heat source through the heat exchanger in the reservoir and back into the engine cooling circuit. A second flow path leads from the engine cooling circuit through the heating/cooling surface and back into the engine cooling circuit. The third flow path leads out of the heat exchanger in the reservoir into the heating/cooling surface and back into the reservoir. Alternatively to a parallel connection, the heat exchanger in the reservoir and the heating/cooling surface in the heat transfer medium circuit can be connected in series. In this series connection, a bypass line and possibly a line with a second heat exchanger are advantageously connected parallel to the heating/cooling surface.

In the device of the present invention, a valve is furthermore assigned to the heating/cooling surface and it can remotely control the flow of the heat transfer medium through the heating/cooling surface. With the valve, the flow of heat transfer medium through the heating/cooling surface is controlled and, in this way, the temperature on the driver's bed or the interior wall of the vehicle is adapted as desired.

Several driver's beds and/or vehicle interior walls can be simultaneously controlled especially easily by an individual device as provided by the present invention by the use of a second heating/cooling surface for a second driver's bed or a second vehicle interior wall which is located in a parallel connection to the first heating/cooling surface.

Two or more heating/cooling surfaces for driver's beds or vehicle interior walls can be individually controlled with respect to their temperature by each of the two heating/cooling surfaces being assigned its own valve with which the flow through the respective heating/cooling surface can be remotely controlled.

For one economical approach to the device of the present invention, alternatively to the parallel connection, a common valve can be assigned to the heating/cooling surfaces, whereby the flow of heat transfer medium through the two heating/cooling surfaces can be remotely controlled.

The device of the present invention can moreover be used to heat the air itself in the passenger compartment. This is possible via a second heat exchanger which is integrated into the heat transfer medium circuit and through which air can flow. The second heat transfer medium can be located in the front and/or rear area of the vehicle interior. The temperature in the vehicle interior or the sleeping berth can then be set via the heat transfer medium flow in the second heat exchanger and the air flow through this heat exchanger. In addition, the driver's bed itself is temperature-controlled by the same heat transfer medium flow, and the temperature of the driver's bed can be influenced by the amount of heat transfer medium flowing therethrough.

At least one heating/cooling surface is advantageously series-connected to the aforementioned second heat exchanger. A bypass line for the heating/cooling surface is formed with an adjustable flow cross section. In this series connection, heat energy is withdrawn in a controlled manner from the heat transfer medium flow first from one of the two means, while already colder heat transfer medium is flowing through the means which is located downstream in the series connection. It is advantageous in this arrangement if at least one heating/cooling surface for heating is located in front of the second heat exchanger in the flow direction from the engine cooling circuit. When flow takes place through the arrangement, the heat transfer medium then heats first the driver's bed before the remainder of its thermal energy is released to the air in the vehicle interior with the second heat exchanger. The driver's bed is then heated first. The aforementioned bypass line is used for flow around the heating/cooling surface when it has been blocked by one of the aforementioned valves. When the driver's bed and the vehicle interior are cooled in turn the focus is on the means through which the heat transfer medium flows first.

Alternatively, at least one heating/cooling surface can also be advantageously located in a parallel connection to the second heat exchanger. In the parallel connection, hot or cold heat transfer medium flows simultaneously through the heating/cooling surface and the pertinent second heat exchanger. Accordingly, the aforementioned heating or cooling of the driver's bed and the air in the vehicle interior takes place therefore uniformly. Both means are therefore operated to the same degree.

In addition, advantageously, a circulation pump is integrated into the heat transfer medium circuit such that it conveys the heat transfer medium through the heat exchanger and the heating/cooling surface and especially also through the second heat exchanger. The circulation pump is used to charge the reservoir with thermal energy and, moreover, enables heating and cooling from the reservoir into the heating/cooling surface of the driver's bed and/or into the second heat exchanger. Besides this circulation pump, using the coolant pump of the internal combustion engine, which is used as a heat source, the liquid heat transfer medium can likewise be conveyed in the heat transfer medium circuit. The coolant pump can likewise convey the heat transfer medium through the heating/cooling surface and/or the heat exchanger, in this case the driver's bed and the air being heated in the vehicle interior by the exhaust heat of the internal combustion engine. Besides an internal combustion engine, an auxiliary heater with a burner and possibly its own circulation pump, an electrical heater and/or a fuel cell (APU means) can be used as the heat source.

In the coolant circuit, a second evaporator is advantageously provided through which preferably air can flow. Using the second evaporator, during operation of the coolant circuit, the air in the motor vehicle interior can be directly cooled. This function is used during operation of the vehicle engine, during which the compressor in the coolant circuit is driven by the engine. The other aforementioned functions in which the reservoir is used, are provided preferably, for auxiliary climate control while the engine of the vehicle is off.

DETAILED DESCRIPTION OF THE INVENTION

Figure 1:
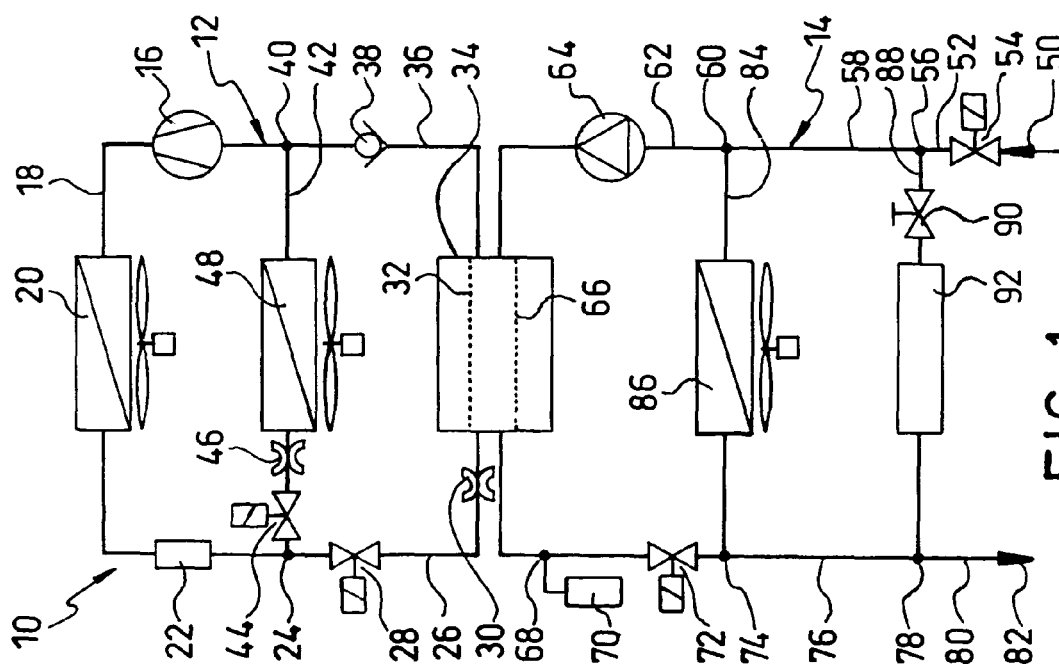
FIG. 1 shows a simplified representation of a first embodiment of a device of the present invention while driving or in auxiliary operation.

FIG. 1 shows a device 10 for climate control of a vehicle interior (not shown), and preferably for the sleeping birth of a truck. The device 10 has a coolant circuit 12 and a heat transfer medium circuit 14 as important components.

The coolant circuit 12 is used to cool a coolant and includes a line 18 proceeding from a compressor 16 and leading to a condenser 20 and further to a collector/drier 22. In the line 18, there is a branch 24 from which a line 26 leads to a valve 28 and then to an expansion valve 30. In the flow direction behind the expansion valve 30, there is an evaporator 32 in a cold/heat reservoir 34. From the evaporator 32, a line 36 leads to a check valve 38 and further to a branch 40 at which the line 36 again meets the line 18.

Between the branch 24 and the branch 40, there is a second line 42 parallel to the evaporator 32, in which proceeding from the branch 24 there are a valve 44, an expansion valve 46 and an evaporator 48. The evaporator 48 is located as a so-called front HVAC in the vehicle interior. Air can be transported through the evaporator 48 and also the condenser 20 by a fan.

The coolant circuit enables the following operating modes: during operation of the compressor 16 which is driven by the internal combustion engine of the truck (not shown), heat is removed from the coolant at the condenser 20 and is subsequently conveyed to the branch 24. At the branch 24, the coolant can be routed by switching the valves 28 and/or 44 selectively into the evaporator 32 and/or the evaporator 48. In the evaporators 32 and 48, heat is supplied to the coolant and thus the vicinity of the evaporators 32 and 48 is cooled.

Air flows through the evaporator 48 and is subsequently routed into the motor vehicle interior to directly cool the air in the interior. This direct cooling of the vehicle interior corresponds to the operation of an ordinary air conditioner.

The evaporator 32 is located in the reservoir 34 so that this reservoir 34 can be cooled and charged by the coolant flowing through the evaporator 32. In the reservoir 34, using the coolant circuit during operation of the compressor 16, "cold" can be stored.

The heat transfer medium circuit 14 is preferably used to heat a liquid heat transfer medium and moreover to cool the driver's bed and/or the vehicle interior or cab wall 144. A feed inlet 50 leads into the heat transfer medium circuit 14 and makes available heat transfer medium from an engine cooling circuit (not shown). From the inlet 50, a line 52 leads to a valve 54 and further to a branch 56. From branch 56, a line 58 leads to another branch 60 from which a line 62 leads to a circulation pump 64 and further to a heat exchanger 66. The heat exchanger 66 is located in the aforementioned cold/heat reservoir 34. In the flow direction downstream of the heat exchanger 66, a compensation tank 70 is connected to the line 62 at the branch 68. A valve 72 is located in the line 62 which leads further to a branch 74. From the branch 74, a line 76 leads to another branch 78. From branch 78, finally a line 80 leads to an outlet 82 which discharges into the engine cooling circuit.

In the engine cooling circuit, on the one hand, there is an internal combustion engine (not shown); its exhaust heat is released to the engine cooling circuit. Furthermore, in the engine cooling circuit, there is an auxiliary heater with a burner and/or an electrical heater. In an embodiment of the device 10 which is not shown, a fuel cell is located in the engine cooling circuit.

Figure 9:
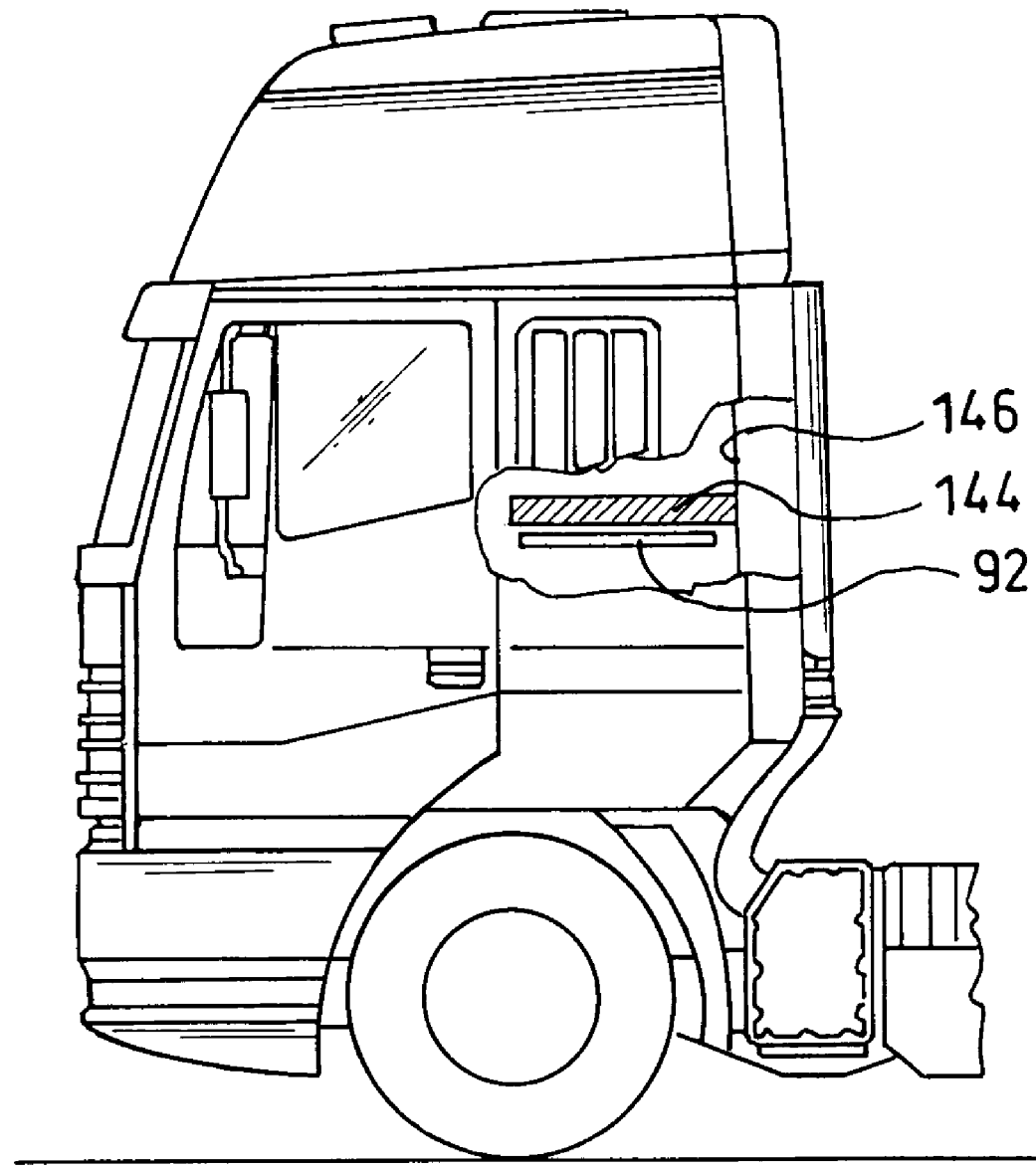
FIG. 9 is a broken-away view of a truck cab showing the driver's bed or the interior wall of the driver's cab.

Between the branch 56 and the branch 78, a line 88 is formed in which a valve 90 and the heating/cooling surface 92 of a driver's bed 144 (FIG. 9) are located. Between the branch 60 and the branch 74, there is a line 84 in which there is a heat exchanger 86. Air flows through the heat exchanger 86, which is also called a rear/front heater (HE), by use of a fan, and into the motor vehicle interior.

Using the heat transfer medium circuit 14, the following functions of the device 10 can be made available on the heating/cooling surface 92 of the driver's bed 144 and the heat exchanger 86. Both the heating/cooling surface 92 and also the heat exchanger 86 can be directly heated with a hot heat transfer medium which is made available from the engine cooling circuit by a coolant pump or delivery pump in the auxiliary heater which is not shown. For this direct heating, the valve 54 is opened and the valve 88 selectively closed. With the valve 88 in particular, the amount of heat transfer medium delivered by the heating/cooling surface 92 per unit of time can be influenced, by which the temperature of the driver's bed 144 can be adjusted. For heating/cooling as provided by the invention, a temperature of the driver's bed 1K to 5K above or below the ambient temperature at a heat output of roughly 30-100 W/m$^2$, especially 50-80 W/m$^2$, is desirable. To prevent flow through the heat exchanger 66 during direct heating, the valve 72 can be closed. In the engine cooling circuit, the heat transfer medium can be heated with the exhaust heat of the internal combustion engine and/or the auxiliary heater.

In addition to direct heating, it is also possible to charge the reservoir 34 with thermal energy from the engine cooling circuit. To do this, with the valve 54 open and the valve 72 open, the heat transfer medium is transported by the circulation pump 64 through the heat exchanger 66. During charging of the reservoir 34 with thermal energy, moreover, the heat transfer medium can be transported by the heat exchanger 86 to heat the air in the vehicle interior or the heat transfer medium can be routed through the heating/cooling surface 92 to heat the driver's bed 144.

In addition, with the heat transfer medium circuit 14, indirect heating can also be enabled by discharging a charged hot reservoir 34 again and by its thermal energy being routed to the heat exchanger 86 and/or the heating/cooling surface 92. The reservoir 34 is discharged in this way using the circulation pump 64 which, with the valve 72 opened, delivers the heat transfer medium to the heat exchanger 86 and, with the valve 90 opened, also to the heating/cooling surface 92. Direct and indirect heating can take place at the same time with both the valve 72 and also the valve 54 being opened.

Finally, with the heat transfer medium circuit 14, a charged cold reservoir 34 can also be discharged and its cold can be conveyed to the heat exchanger 86 and/or especially to the heating/cooling surface 92 of the driver's bed 144. In these operating modes of indirect cooling, using the circulation pump 64, the heat transfer medium is conveyed through the cold reservoir 34. With the valve 72 open, the heat transfer medium travels to the heat exchanger 86 and, with the valve 90 open, also travels to the heating/cooling surface 92. The cold heat transfer medium can be prevented from flowing into the engine cooling circuit by closing the valves 54 and 102. Indirect cooling is carried out preferably when the internal combustion engine is off, during which the compressor 16 is not driven.

Overall, the following operating modes can be implemented with the coolant circuit 12:

1. only cooling at the evaporator 48 (air conditioner function);
2. only charging of the reservoir 34 at the evaporator 32 (charging while driving);
3. simultaneous cooling on the evaporator 48 and charging at the evaporator 32.

The following operating modes can be implemented with the heat transfer medium circuit 14:

1. only discharging of the cold reservoir 34 at the heat exchanger 86;
2. only discharging of the cold reservoir 34 at the heating/cooling surface;
3. simultaneous discharging of the cold reservoir 34 at the heat exchanger 86 and at the heating/cooling surface 92;
4. only charging of the reservoir 34 with the heat exchanger 66;
5. only heating at the heat exchanger 86;
6. only heating at the heating/cooling surface 92;
7. simultaneous charging of the reservoir 34 and heating at the heat exchanger 86 and/or at the heating/cooling surface 92;
8. only heating at the heat exchanger 86 and/or at the heating/cooling surface 92.

These diverse operating modes of the device 10 can moreover be extensively varied by combining the functions of the coolant circuit 12 with those of the heat transfer medium circuit 14. In this way, for example, during operation of the compressor 16, the vehicle interior can be cooled, for example, via the evaporator 48 and, at the same time, via the reservoir 34 and the heat exchanger 86. Moreover, the heating/cooling surface 92 of the driver's bed 144 can be cooled from the reservoir 66.

The different heating functions of the heat transfer medium circuit 14 can be further varied by the exhaust heat of the internal combustion engine and the heat output of the auxiliary heater or a heater being used in the engine cooling circuit.

The device 10 enables simple, reliable and moreover highly flexible climate control of the heating/cooling surface of a driver's bed 144. The heating and cooling of the driver's bed 144 takes place in combination with the heating and cooling of air in the motor vehicle interior so that overall the level of comfort for the driver of the vehicle is greatly increased.

Figure 2:
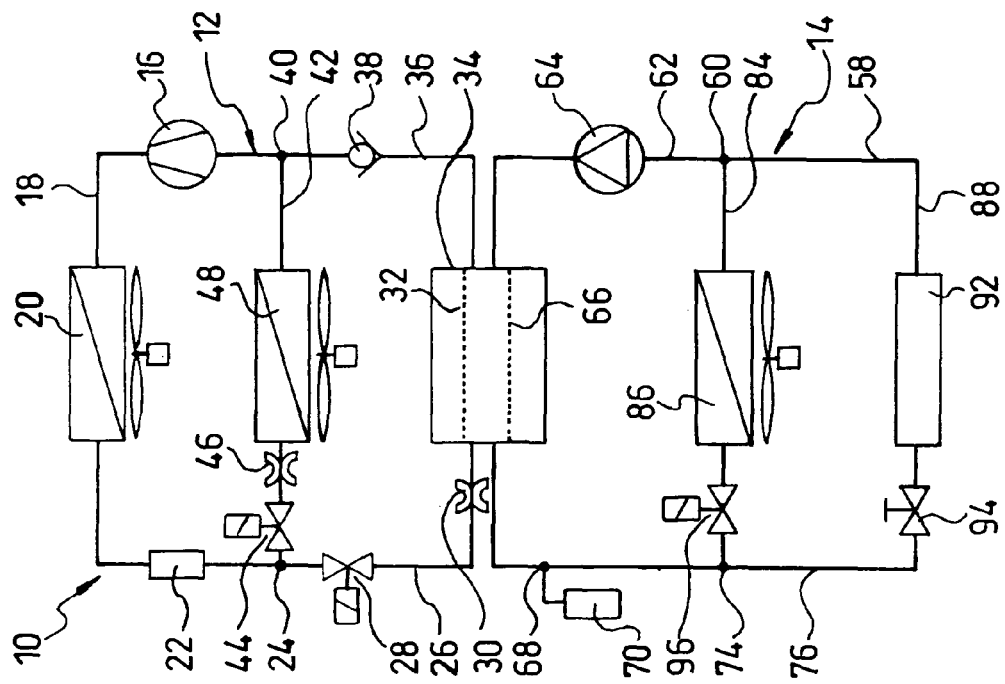
FIG. 2 shows a simplified representation of a second embodiment of a device of the present invention in auxiliary operation.

FIG. 2 shows an embodiment of the device 10 in which the heat transfer medium circuit 14 is made slightly differently. Instead of the valve 72 as shown in FIG. 1, in the line 84 as shown in FIG. 2, a valve 96 is located next to the heat exchanger 86. Furthermore, in the line 88, the valve 90 as shown in FIG. 1 is replaced by the valve 94 on the side of the heating/cooling surface 92, which is the left one in FIG. 2. The two valves 92 and 94 enable dedicated control of the flows of the heat transfer medium through the heat exchanger 86 and the heating/cooling surface 92 such that the aforementioned operating modes can be controlled with especially high temperature control accuracy.

Figure 3:
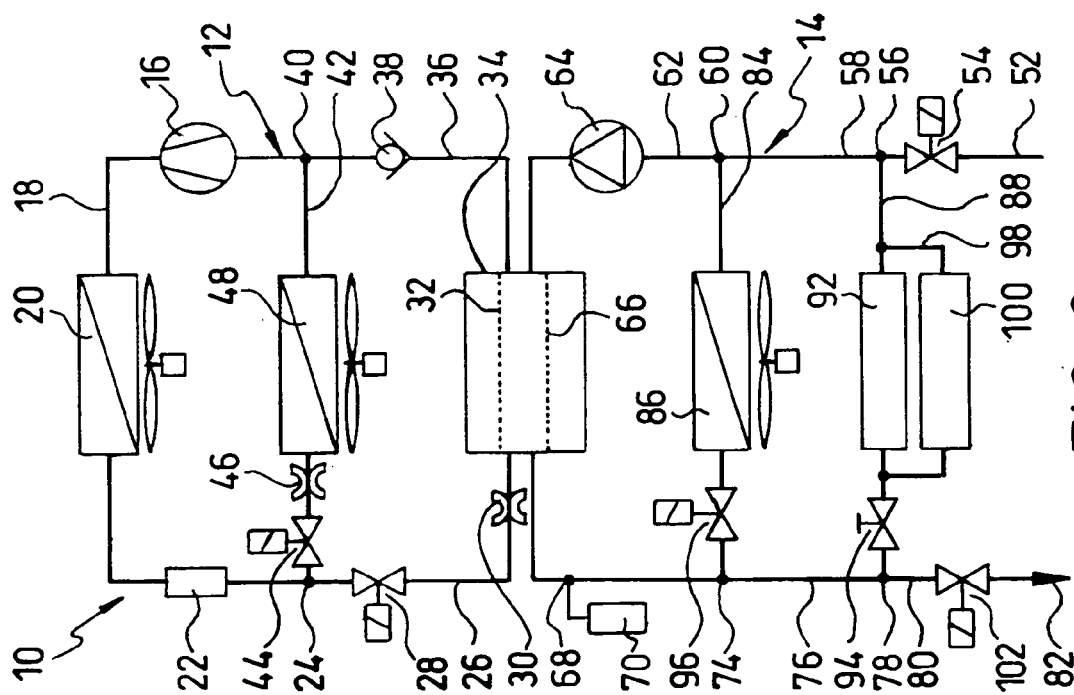
FIG. 3 shows a simplified representation of a third embodiment of a device of the present invention while driving or in auxiliary operation.

FIG. 3 illustrates a device 10 in which, in contrast to the device as shown in FIG. 2, a line 98 is connected parallel to the heating/cooling surface 92 wherein there is a second heating/cooling surface 100. To control the flow of the heat transfer medium through the two heating/cooling surfaces 92 and 100, a valve 94 is provided downstream of the union of the lines 88 and 98.

Furthermore, in the device as shown in FIG. 3, in the line 80, there is another valve 102 by means of which the heat transfer medium circuit 14 can also be closed at the outlet 82 relative to the engine cooling circuit.

Figure 4:
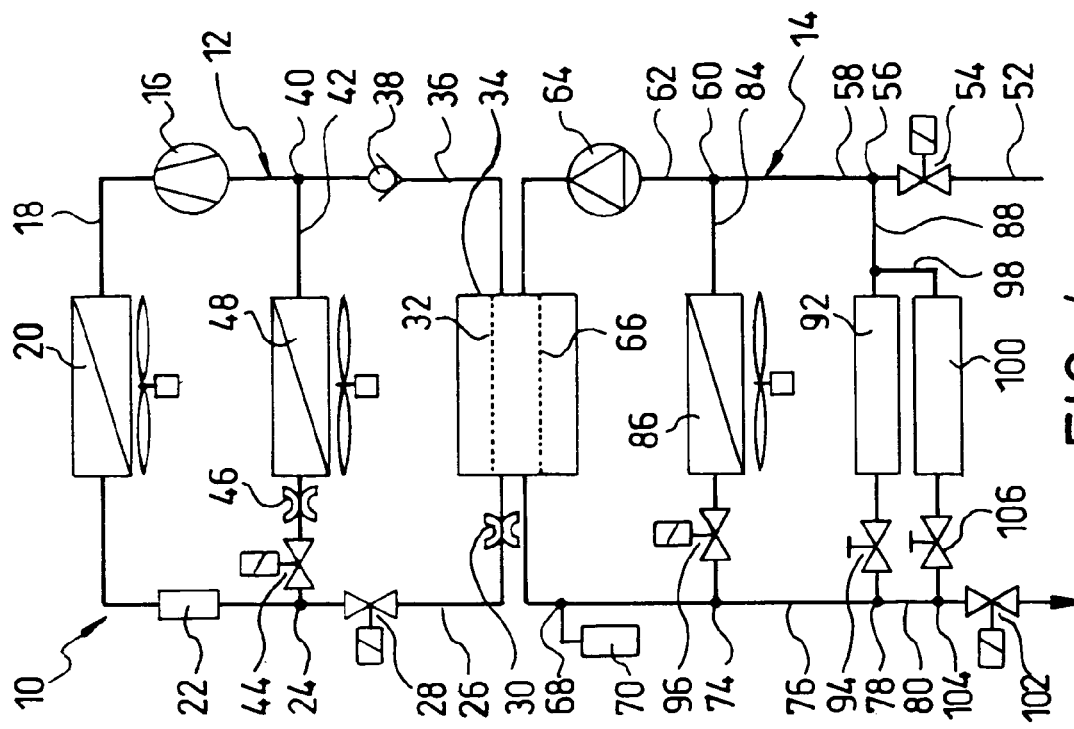
FIG. 4 shows a simplified representation of a fourth embodiment of a device as claimed in the invention while driving or in auxiliary operation.

FIG. 4 shows a device 10 in which, instead of the joint control of the flow through the two heating/cooling surfaces 92 and 100 using only one valve 94, there is another valve 106. While the valve 94 in the line 88 is assigned to the heating/cooling surface 92, using the valve 106, the line 98 of the second heating/cooling surface 100 can be closed. In this way the individual flows in the heating/cooling surfaces 92 or 100 can be controlled individually. There is another branch 104 as the discharge of the line 98 into the line 80.

Figure 6:
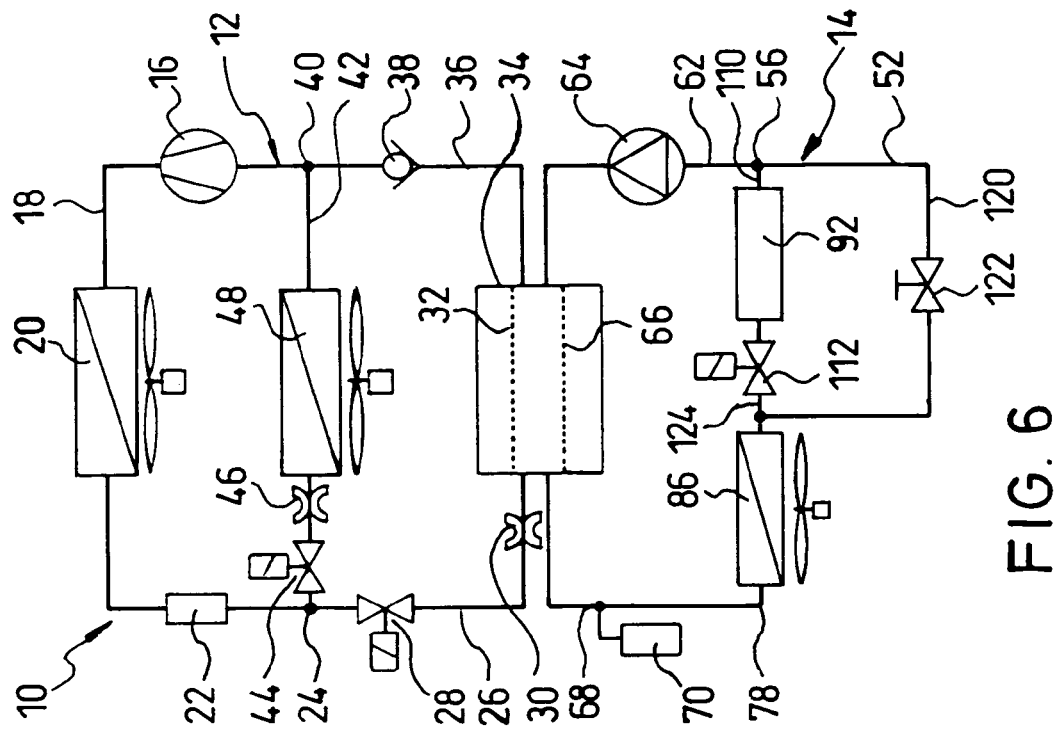
FIG. 6 shows a simplified representation of a sixth embodiment of the device of the present invention in auxiliary operation.
Figure 5:
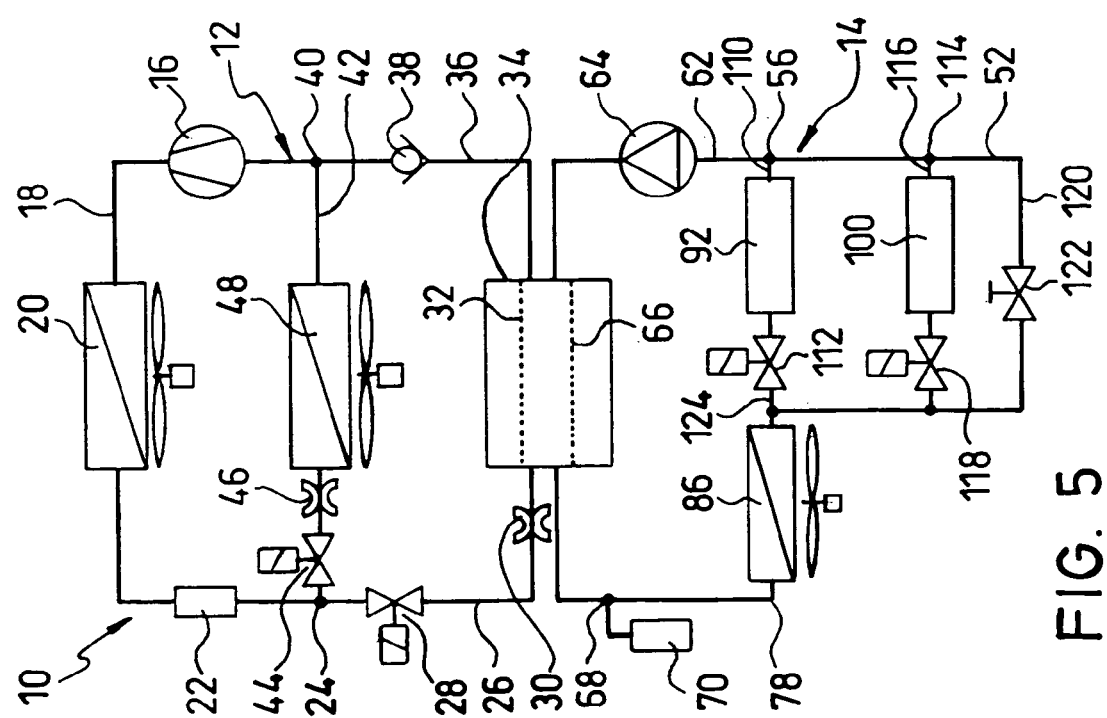
FIG. 5 shows a simplified representation of a fifth embodiment of the device of the present invention in auxiliary operation.

FIGS. 5 and 6 each show a device 10 in which with the heating/cooling surface 92 and the heat exchanger 86, a series connection is formed within the heat transfer medium circuit 14. This series connection is made in the line 110 which extends from the branch 56 as shown in FIG. 1 in the direction to the branch 78 as shown in FIG. 1. In the line 110, there are a heating/cooling surface 92 and furthermore a valve 112 with which the flow through the heating/cooling surface 92 can be controlled. Furthermore, on the branch 114 in the line 52, a line 116 branches off in which selectively, as shown in FIG. 5, a second heating/cooling surface 100 and the pertinent valve 118 may be provided. The two heating/cooling surface 92 and 100 in this way, within the series connection, form a parallel connection. For the heating/cooling surface 92, there is furthermore as shown in FIG. 5 and also FIG. 6, a bypass line 120 in which the valve or a choke 122 is located. Using the bypass line 120, the heat transfer medium can be routed around the heating/cooling surface 92 and also the heating/cooling surface 100 when, with the flowing heat transfer medium solely or to an increased degree, the heat exchanger 86 can be controlled. The heat exchanger 86 is located in a line 124 in the flow direction behind the heating/cooling surfaces 92 and 100.

In the series connection shown in FIGS. 5 and 6, during heating out of the engine cooling circuit, upstream of the heat exchanger 86, the heating/cooling surface 92 and 100 can be started with the hot heat exchanger. This leads to an especially rapid heat-up of the heating/cooling surfaces 92 and 100, especially while driving. When hot or cold is discharged from the reservoir using the circulation pump 64, conversely first the heat exchanger 86 and subsequently the heating/cooling surfaces 92 and 100 are started with the hot or cold heat transfer medium. Accordingly especially during auxiliary operation of the device 10, the heat exchanger 86 is operated to an intensified degree. The heating/cooling performance of the heat exchanger 86 can be influenced both by means of the flow of heat transfer medium transported by it and also by means of the amount of air delivered per unit of time by the heat exchanger 86.

Figure 7:
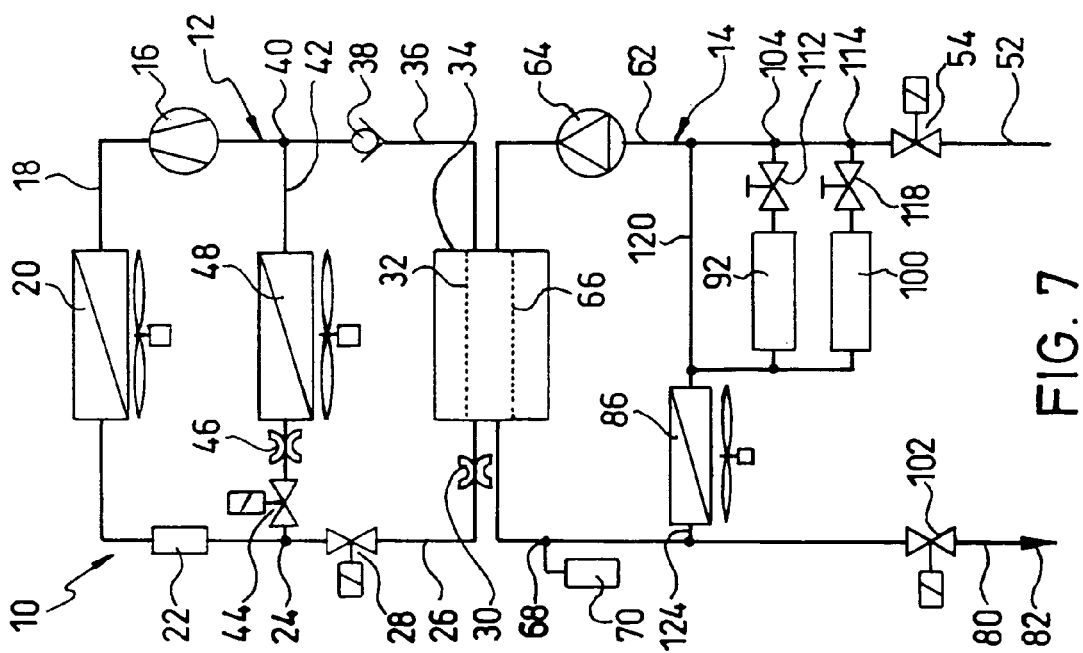
FIG. 7 shows a simplified representation of a seventh embodiment of the device of the present invention while driving or in auxiliary operation.

FIG. 7 shows a device 10 which is structured essentially like the device as shown in FIG. 5. However, as shown in FIG. 7, the bypass line 120 is made in a direct continuation of the line 124. Furthermore, in the bypass line 120, there is no valve so that the flow of heat transfer medium is conveyed essentially by the heat exchanger 86. Heating and cooling on the heat exchanger 86 are controlled solely by the corresponding operation of its fan. The heating/cooling surfaces 92 and 100 are connected in parallel to the bypass line 120 analogously to FIG. 5.

Figure 8:
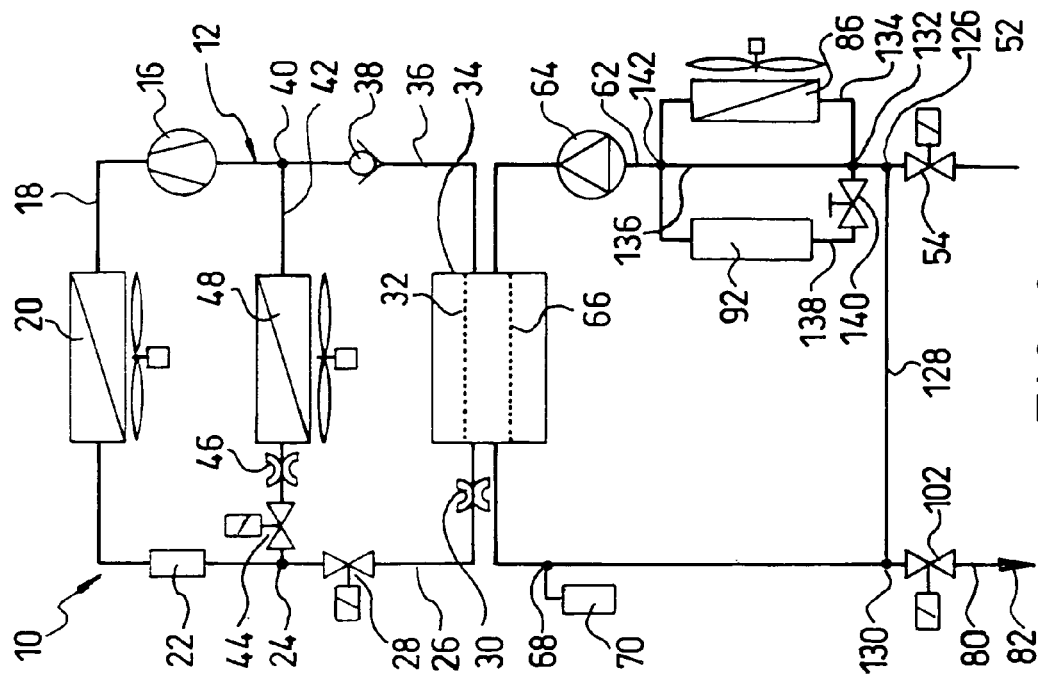
FIG. 8 shows a simplified representation of an eighth embodiment of the device of the present invention while driving or in auxiliary operation.

Finally, FIG. 8 shows the device 10 in which, in the line 52 of heat transfer medium circuit 14, a branch 126 is formed from which a line 128 leads continuously to a branch 130 which is located in the line 80 at the outlet 82. In the device 10 as shown in FIG. 8, furthermore in the flow direction downstream of the branch 126 proceeding from the triple junction 136, a parallel connection is formed from the line 134, the line 136 and the line 138. In the line 138, there are a valve 140 and the heating/cooling surface 92. The line 136 extends continuously from the branch 132 to a branch 142 at which the three lines 134, 136 and 138 come together.

The parallel connection of the three lines 134, 136, 138 selectively enables flow through the heat exchanger 86, direct diversion to the reservoir 34 and/or flow through the heating/cooling surface 92. Moreover, the line 128 can deliver the heat transfer medium directly back into the engine cooling circuit without it flowing further through the heat transfer medium circuit 14. In this way, the engine cooling circuit can be heated up especially quickly after the starting of the internal combustion engine.

We claim:

1. A device for climate control of a vehicle interior, comprising:
 a coolant circuit including a compressor, a condenser, and an evaporator;
 a heat transfer medium circuit including a heat source and a first heat exchanger;
 a heat/cold reservoir in which the evaporator and the first heat exchanger are located; and
 a heating/cooling surface integrated in the heat transfer medium circuit and being connected in parallel to the first heat exchanger;
 a second heat exchanger integrated in the heat transfer medium circuit and being connected in parallel to the heating/cooling surface;
 means for fluid conductively connecting the heating/cooling surface with the first heat exchanger, which means for fluid conductively connecting have a connecting and a non-connecting state;

means for fluid conductively connecting the second heat exchanger with the first heat exchanger, which means for fluid conductively connecting the second heat exchanger have a connecting and a non-connecting state;

means for fluid conductively connecting the heating/cooling surface with the heat source, which means for fluid conductively connecting the heating/cooling surface have a connecting and a non-connecting state;

means for fluid conductively connecting the second heat exchanger with the heat source, which means for fluid conductively connecting the second heat exchanger with the heat source have a connecting and a non-connecting state; and a circulation pump integrated in the heat transfer medium circuit, which circulation pump is arranged for pumping at least part of said heat transfer medium, coming directly from said heat source, through said first heat exchanger.

2. The device of claim 1, wherein said circulation pump is arranged for pumping said heat transfer medium through said heating/cooling surface.

3. The device of claim 1, further including a second evaporator integrated into said coolant circuit which exchanges heat with an air flow.

* * * * *